Nov. 13, 1923.
W. B. WOLFF
1,473,658
SLICING MACHINE
Filed May 18, 1922
5 Sheets-Sheet 3
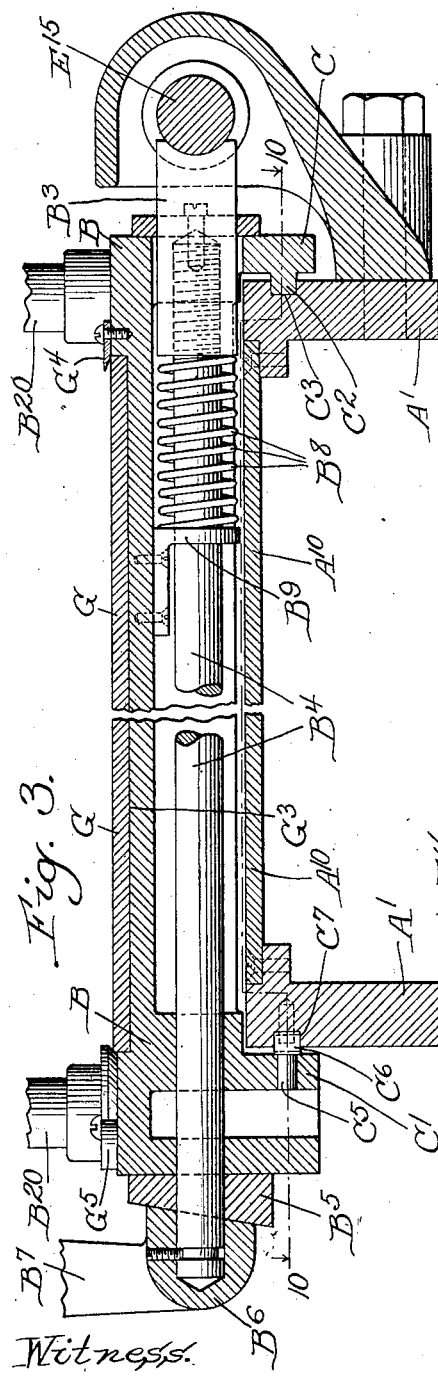
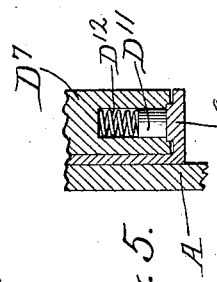
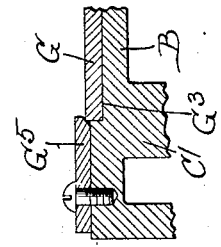
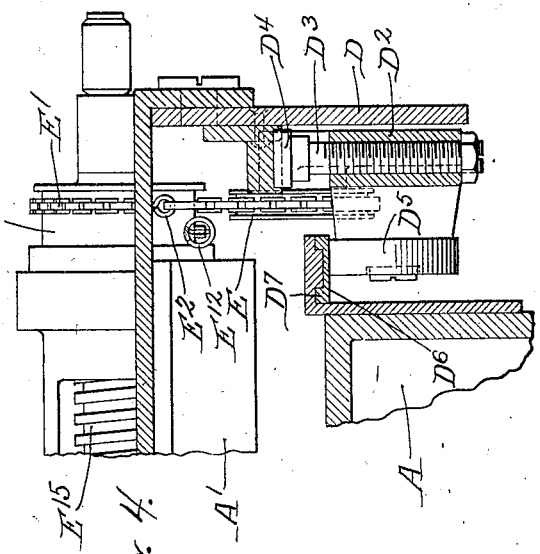
Inventor.
Wallace B. Wolff.
Witness.
Edward T. Wray.
by Parker & Carter
Attorneys.

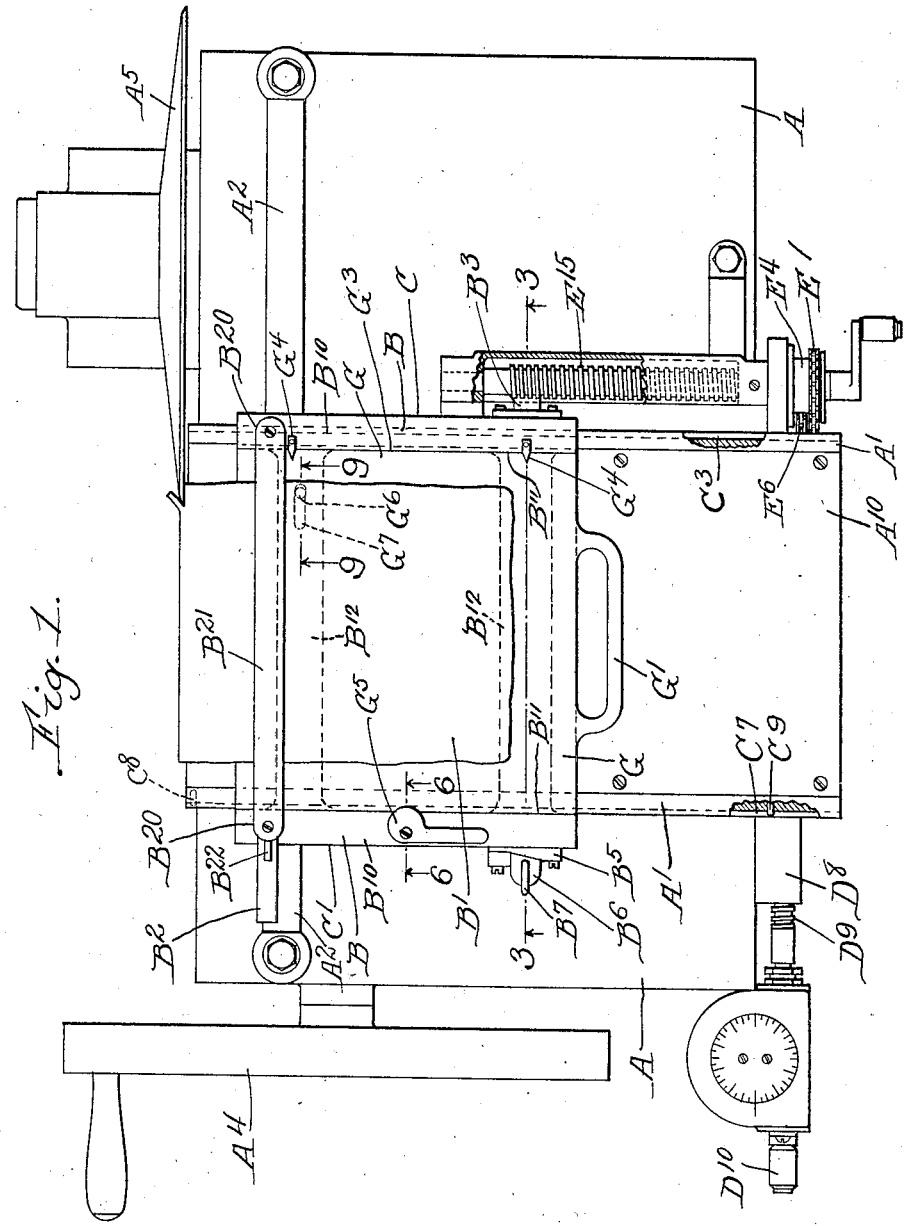

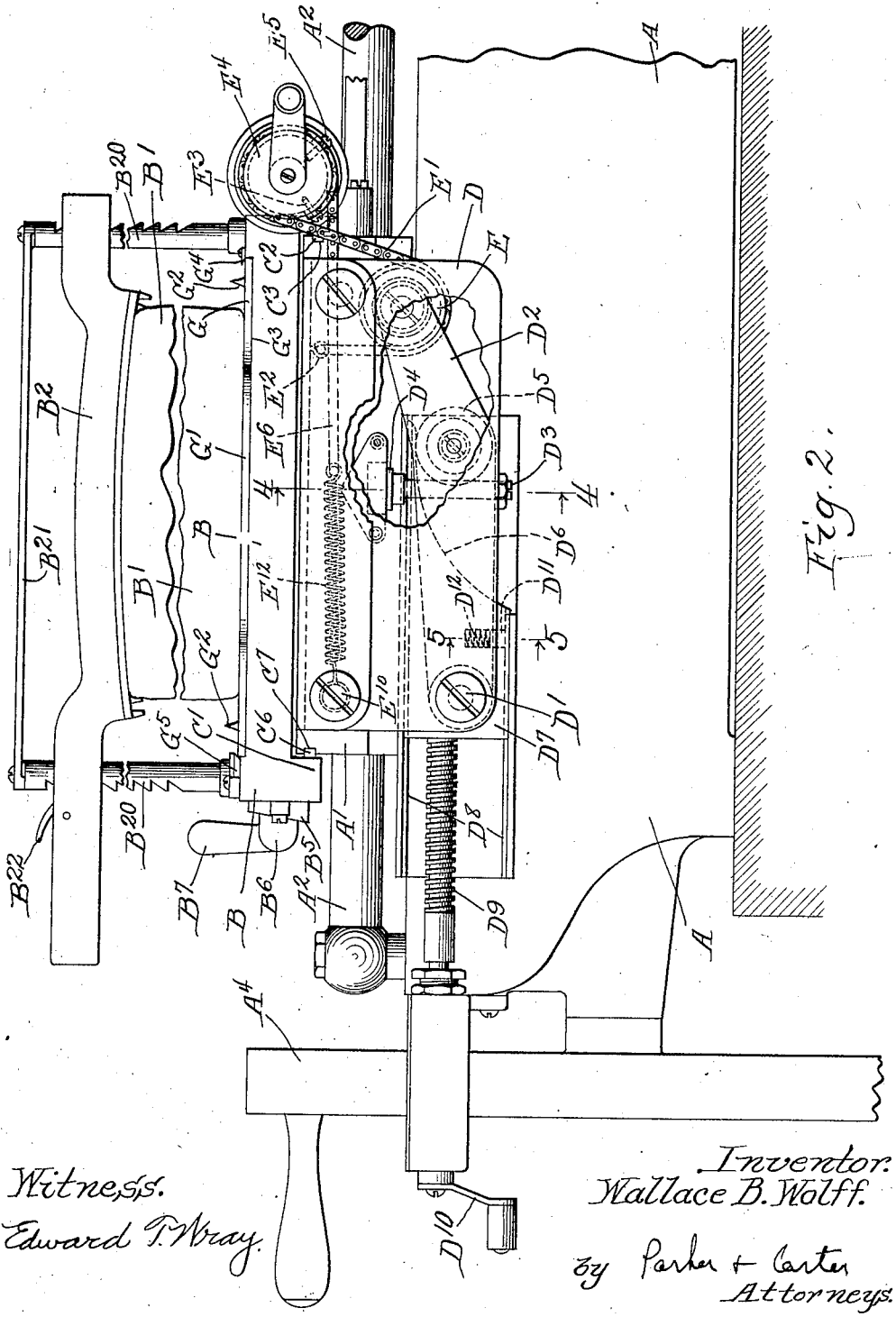

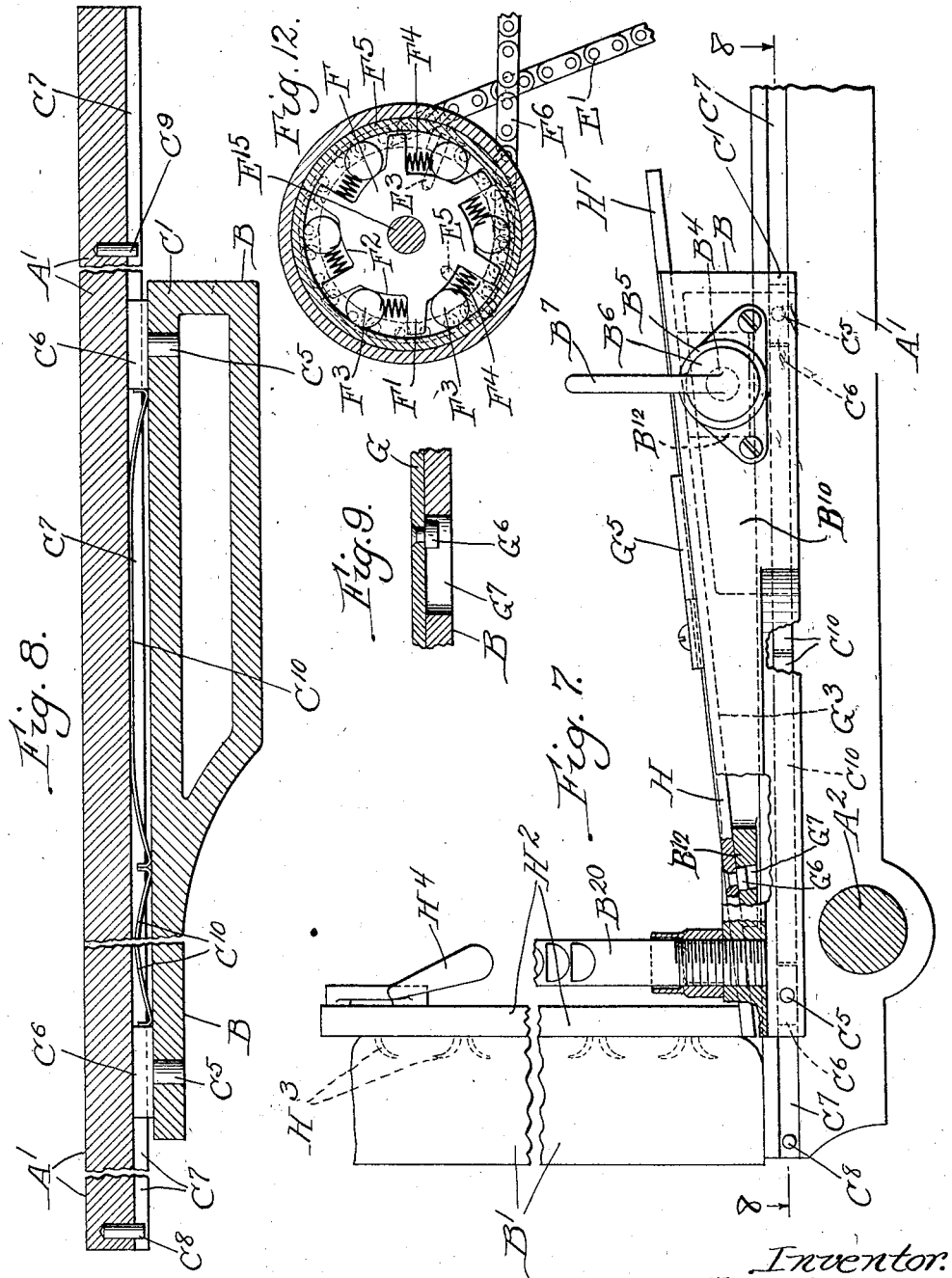

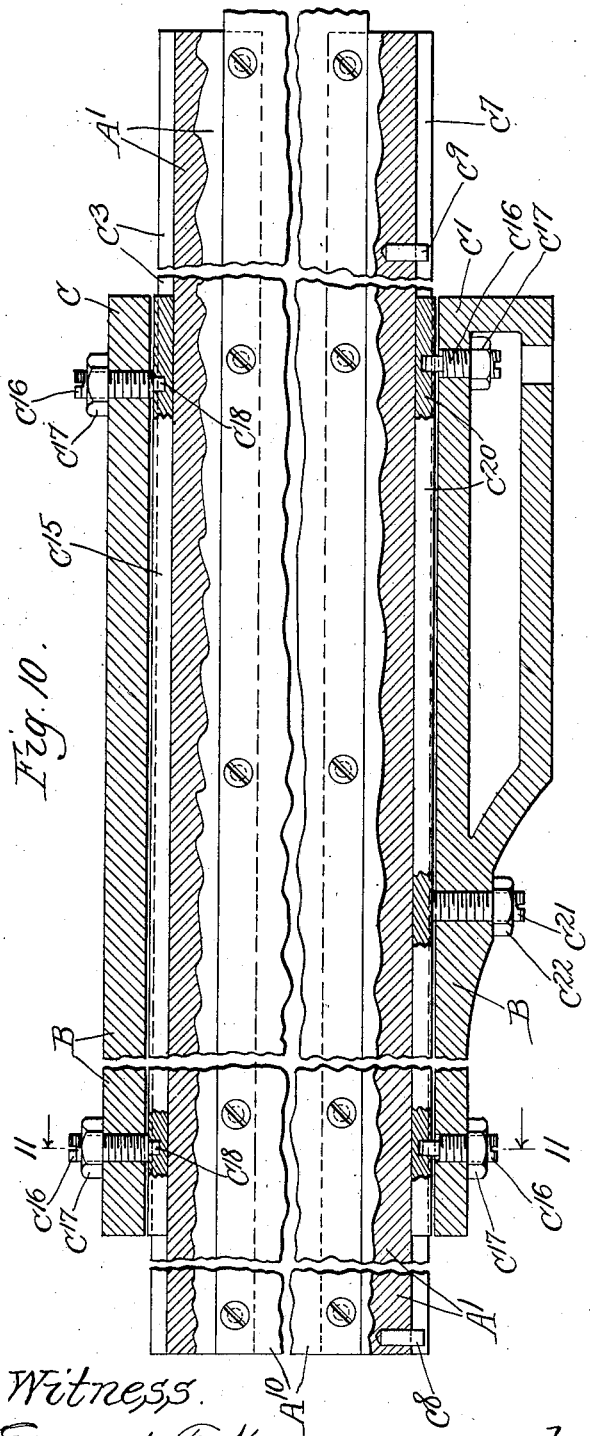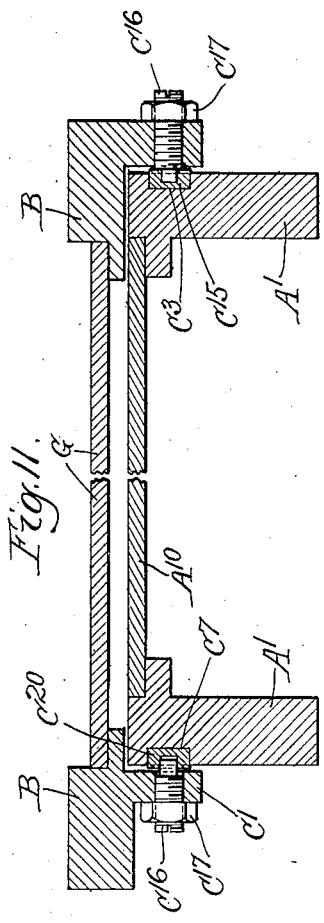

Patented Nov. 13, 1923.

1,473,658

UNITED STATES PATENT OFFICE.

WALLACE B. WOLFF, OF CHICAGO, ILLINOIS.

SLICING MACHINE.

Application filed May 18, 1922. Serial No. 561,810.

*To all whom it may concern:*

Be it known that I, WALLACE B. WOLFF, a citizen of United States, residing at Chicago, in the county of Cook and State of Illinois, have invented a certain new and useful Improvement in Slicing Machines, of which the following is a specification.

My invention relates to a meat-slicing machine, and particularly to a slicing machine of the type wherein a meat carrier is reciprocated back and forth past a circular rotating knife, the meat carrier proper being fed forward in the course of each reciprocation so that a slice of substantially uniform thickness is removed in the course of each reciprocation. It has for object to provide simplified means for controlling the forward feed of the meat carrier. Another object is to provide improved means for removing the meat-engaging plate and substituting a meat end plate which is adapted directly to hold the butt of meat in order that the meat may be used with a minimum of waste. Other objects will appear from time to time in the course of the specification and claims.

I illustrate my invention more or less diagrammatically in the accompanying drawings, wherein—

Fig. 1 is a plan view;
Fig. 2 is an end view;
Fig. 3 is a section on the line 3—3 of Fig. 1;
Fig. 4 is a section on the line 4—4 of Fig. 2;
Fig. 5 is a section on the line 5—5 of Fig. 2;
Fig. 6 is a section on the line 6—6 of Fig. 1;
Fig. 7 is a view of my device showing a meat end plate in position thereon;
Fig. 8 is a section on the line 8—8 of Fig. 7;
Fig. 9 is a section on the line 9—9 of Fig. 1;
Fig. 10 is a section similar to Fig. 8, though a variant form;
Fig. 11 is a section on the line 11—11 of Fig. 10 and
Fig. 12 is a detail section of the overrunning clutch.

Like parts are indicated by like characters throughout the drawings and specifications.

A is a slicing machine frame or supporting structure. A' is a carriage adapted to reciprocate across the frame or support, the forward end being adapted to slide on the track or bar $A^2$, which passes therethrough, and any suitable track means may be provided for the opposite end. The carriage A' is adapted to reciprocate in response to rotation of the drive wheel $A^4$. $A^5$ is the cutting knife, rotated by any suitable driving means, not shown, in response to the action of the drive wheel $A^4$. $A^{10}$ is a plate connecting the two sides of the carriage A'.

B is a forwardly inclined meat support consisting of the side bars $B^{10}$, $B^{10}$ and the cross bars $B^{12}$, $B^{12}$, the intervening space being open. The side bars $B^{10}$ are provided with the internal ledges $B^{11}$ adapted to receive and support the edges of the removable meat plate G, provided with a handle $G^1$ and the meat engaging spikes $G^2$. It is shaped to fit snugly in said ledges, its top being substantially even with the tops of the side arms. It may be locked in place by any suitable means, for example, by the over-lying stops or studs $G^4$ at one side and the latch or clamp $G^5$ at the other. Its movement along the side bars is prevented by the stop $G^6$ which penetrates the slot $G^7$, which slot is made long enough to permit the edge of the plate B to pass under the studs $G^4$ without binding. The meat plate carries a piece of meat B', held by any suitable clamp $B^2$. $B^3$ is a nut or nut section mounted in the meat support B. $B^5$ is an inclined faced block and $B^6$ an opposed inclined faced element pinned to the outer end of the rod $B^4$, and having connected thereto a handle $B^7$. $B^8$ is any suitable spring element adapted to be compressed between the stop $B^9$, mounted on the meat support B, and the rear of the nut element $B^3$.

Secured to the front end of the meat support B are the vertical, outwardly notched bars $B^{20}$ on which slides the catch $B^2$ provided with the notch engaging catch $B^{22}$. The tops of the bars are connected by the cross piece $B^{21}$.

The meat support B is provided with depending side portions C, C'. C has a projecting supporting flange $C^2$ which slides in the slots $C^3$ of the carriage A'. C' is penetrated by the pins $C^5$ $C^5$, which hold in place the blocks or stops $C^6$ $C^6$, adapted to travel in the slot $C^7$ on the carriage A'. $C^8$ $C^9$ are pins in said slot, adapted to limit the travel of blocks $C^6$ therealong, and $C^{10}$ $C^{10}$ are spring elements which serve to hold the flange $C^2$ snugly in the slot $C^3$, to prevent rattling and to take up wear.

Figures 10 and 11 illustrate a variant form of guide and support wherein the slots $C^3$ and $C^7$ are penetrated by bearing bars $C^{15}$ $C^{20}$ of any suitable metal, for example, brass. The travel of the bars is limited by the pins or stops $C^8$ $C^9$. The bar $C^{15}$ is secured adjacent its ends by the screws $C^{16}$ and the nuts $C^{17}$, the inner ends of the screws being provided with the bar penetrating pins $C^{18}$. Through the bolts and the penetrating pins the member B is supported by the bar, out of contact with the top of the carriage A'. The opposite bar $C^{20}$ is similarly engaged at its ends by screws provided with lock nuts. It is also engaged intermediate at its ends and between the screws by an additional adjusting or wear compensating screw $C^{21}$ provided with a lock nut $C^{22}$.

Secured to the rear of the carriage A' is the depending terminal plate D, which has pivoted to it, as at D', a lever $D^2$ provided with an adjustable stop $D^3$ in opposition to a stud $D^4$ mounted on the plate D, and preferably composed of rubber or similar resilient material. $D^5$ is a roller mounted on the lever $D^2$ and adapted to engage the curved track or cam face $D^6$ of the cam $D^7$, which is slidably mounted between the guides $D^8$ and may be moved therealong by the worm $D^9$ and the worm-rotating crank $D^{10}$. The cam is yieldingly kept in close engagement with the upper track $D^8$, as, for example, by the bearing plate $D^{11}$ and the spring $D^{12}$.

At the outer end of the lever $D^2$ is pivoted the pulley E, about which passes the chain E', the inner end of which is secured as at $E^2$ to the carriage A', the outer end being secured on the drum $E^4$ as at $E^3$. Secured as at $E^5$ on the drum $E^4$ is a second chain $E^6$ which is continued at its inner end by the spring $E^{12}$ which in turn is secured as at $E^{10}$ to the rear of the plate D. The points of attachment of the chains to the drum are staggered in order to permit overlapping of the chains.

The drum $E^4$ is mounted on the feeding worm $E^{15}$ by means of any suitable ball ratchet or overrunning clutch, herein illustrated as a clutch plate F with fingers F' interposed between cam surface $F^2$. Balls $F^3$ are adapted to roll along the cam surface, being forced yieldingly toward the outer surfaces thereof by the springs $F^4$ abutting against the fingers F' and being adapted to be compressed and locked against the clutch drum $F^5$ by a reversal of the normal rotational direction.

Shown in Fig. 7 is the end plate H, with handle H', which may be substituted for the plate G and is similarly fixed in place. It is provided with an upwardly projecting meat engaging face $H^2$, in which are mounted the meat engaging hooks $H^3$ actuated in any suitable manner by the handle $H^4$. It will be observed that the plate G and the end plate H are operative independent of the clamp $B^2$ and stay bar $B^{21}$ and pass freely thereunder.

It will be understood that while I have illustrated and described an operative device, still many changes might be made in the number, size, shape and relation of parts without departing from the spirit of my invention. I wish, therefore, that my drawings be taken as in a large degree diagrammatic.

The use and operation of my invention are as follows:

My meat cutter is of the well known type wherein a circular knife is driven by any suitable driving means, manual or power, and a meat carriage is reciprocated past the cutting edge of the knife. The meat carrier proper is moved forward on the carriage by a step by step motion, in response to reciprocation of the carriage, and thus thin slices are cut from the meat. I illustrate a peculiarly advantageous feeding mechanism, wherein the rotation of the feed screw $E^{15}$ is effected automatically in response to the reciprocation of the carriage by the engagement of the roller $D^5$ against the cam face $D^6$, and the consequent rotation of the lever $D^2$, which thus downwardly moves the pulley E and draws the chain E' about the pulley $E^4$. As the chain or belt $E^1$ is drawn about the pulley, the pulley by its rotation rotates the over-running clutch illustrated in Figure 12 and thus rotates the worm $E^{15}$. The yielding section $E^{12}$ of the chain $E^6$ serves to keep the lever normally in its upper position, the stop $D^3$ being compressed against the yielding stud $D^4$. The cam may be adjusted across the end of the base, in order to control the rotation of the feed screw. I also provide manual means for rotating the feed screw in order to push the meat plate up to the knife. The rotation of the feed screw moves the meat carriage B and the plate G in unison toward the knife, since the nut element $B^3$ is kept in normal engagement with the worm $E^{15}$. When it is desired to disconnect the nut from the worm, the handle $B^7$ is rotated and the member $B^6$ travels outwardly upon the inclined surface of the cam element $B^5$, thus withdrawing the bar B⁴ against the spring B⁸. The meat carrier may then be freely and manually moved. If it is desired to remove the meat, it is not necessary to remove the carrier as a whole, or to remove any heavy upper element thereof, as has in the past been the custom. I provide a light, thin, meat carrier to which the meat may be secured, as, for example, by studs or spikes, and the meat-end plate together may be inserted in the machine and placed beneath the meat clamp. The plate, however, may be secured to the carrier as shown in Fig. 1. When it is wished to remove meat-end plate, the meat clamp is loosened, the element G⁵ is rotated, and the plate and meat may then be freely removed. This is particularly advantageous, since it permits the easy application and removal of the meat and the easy and quick substitution of a meat-end plate, such as shown in Fig. 7. This end plate is entirely disassociated from the normal meat clamp and may be used without interfering with such clamp, since it is of the proper dimensions to penetrate through the clamping aperture.

The meat carrier I build overhanging the reciprocating carriage, the reciprocating carriage being slotted to engage the inwardly projecting flange C² on one side and the inwardly projecting stops and springs on the other, as shown in Fig. 3. The pins mounted in the slots engage the stops mounted on the carrier and thus limit its travel. The springs are confined in relation to the carrier by the stops but are slidable along the slots and serve to prevent rattling and to take up wear.

In the variant form shown in Figures 10 and 11 the slots serve as tracks for two opposed bearing bars, and the compensation for wear and the prevention of play is provided by tightening or inwardly forcing one or both bars.

In either form the bars or the blocks serve as supports for the meat support B, which is held out of contact with and slightly above the top of the carriage A'. Not merely does this provide an easier running connection but it enables the carrier or meat support B to be easily removed or replaced. Also, the top of the carriage A' is easily cleaned and there is a minimum possibility of bits of meat working in and becoming wedged beneath the meat support. By keeping the feed plate out of contact with the top of the carriage it is possible to position the supporting bearing entirely out of contact with the meat or material being cut. It is thus possible properly to lubricate the supporting bearings without any chance of contamination of the food by the lubricating oil.

I claim:

1. In a slicing machine a reciprocating member, and means for reciprocating it across the face of the cutting element, a carrier mounted thereon, and means for feeding it toward the cutting element in response to said reciprocation, comprising a worm on said reciprocating element, a nut on said carrier and means for rotating said worm to advance said carrier, comprising a pulley on said worm, a lever mounted on said reciprocating member, a pulley carried by said lever, a flexible element bent about each of said pulleys, and means for rotating the worm by varying the distance between said pulleys.

2. In a slicing machine, a reciprocating member, and means for reciprocating it across the face of the cutting element, a carrier mounted thereon, and means for feeding it toward the cutting element in response to said reciprocation, comprising a worm on said reciprocating element, a nut on said carrier and means for rotating said worm to advance said carrier, comprising a pulley on said worm, a lever mounted on said reciprocating member, a pulley carried by said lever, a flexible element bent about each of said pulleys, and means for rotating the worm by varying the distance between said pulleys, comprising a cam element mounted on the slicing machine frame and a cam stop on said lever adapted to engage said cam element in the course of each reciprocation of the reciprocating member.

3. In a slicing machine comprising a cutter, a reciprocating element and a forwardly feeding element, means for feeding said element forward in response to the motion of the reciprocating element, comprising a member rotatably mounted on the feeding element, a pulley therefor, a pulley lever and pulley mounted on the reciprocating element, a flexible connection between the two pulleys and means for varying the distance between said pulleys.

4. In a slicing machine comprising a cutter, a reciprocating element and a forwardly feeding element, means for feeding said element forward in response to the motion of the reciprocating element, comprising a member rotatably mounted on the feeding element, a pulley therefor, a pulley lever and pulley mounted on the reciprocating element, a flexible connection between the two pulleys and means for varying the distance between said pulleys, comprising a cam element on the slicing machine and a cam stop on the pulley lever adapted to be brought in contact with said cam element in the course of reciprocation.

5. In a slicing machine comprising a cutter, a reciprocating element and a forwardly feeding element, means for feeding said element forward in response to the reciprocation, comprising a member rotatably mounted thereon, a pulley therefor, a pulley lever and pulley mounted on the reciprocating element, a flexible element bent about said pulleys and fixed at each end to the reciprocating element, a cam element mounted on the slicing machine, and a cam stop on said pulley lever, adapted to be brought in contact with said cam element by the reciprocation.

6. In a slicing machine comprising a cutter, a reciprocating element and a forwardly feeding element, means for feeding said element forward in response to the reciprocation, comprising a member rotatably mounted thereon, a pulley therefor, a pulley lever and pulley mounted on the reciprocating element, a flexible element bent about said pulleys and fixed at one end to the reciprocating element, a cam element mounted on the slicing machine, and a cam stop on said pulley lever, adapted to be brought in contact with said cam element by the reciprocation, and means for adjusting said cam element along the reciprocating excursion.

7. In a slicing machine comprising a cutter, a reciprocating element and a forwardly feeding element, means for feeding said element forward in response to the reciprocation, comprising a member rotatably mounted thereon, a pulley therefor, a pulley lever and pulley mounted on the reciprocating element, a yielding and flexible element bent about said pulleys and fixed at one end to the reciprocating element, a cam element mounted on the slicing machine, and a cam stop on said pulley lever, adapted to be brought in contact with said cam element by the reciprocation.

8. In a slicing machine a reciprocating element, a feeding element adapted to be fed forward by the reciprocation of the reciprocating element, a worm mounted on said reciprocating element and adapted to be driven by said reciprocation, a nut mounted on said feeding element, means for holding it normally in contact with said worm, and means for withdrawing it from said contact, comprising a cam element in connection with said nut and an opposed cam element on said carrier, and means for rotating them in relation to each other.

9. In a meat slicing machine a reciprocating element, a feeding element adapted to be fed forward by the reciprocation of the reciprocating element, a meat clamp on said feeding element, and a removable meat plate mounted on said element, and securing means therefor comprising overhanging stops at one side of said feeding element and a rotatable eccentric clamp at the other side thereof.

10. A feeding element and means for rotating it, comprising a worm rotatable thereon, a pulley in association with said worm, a pulley mounted adjacent said worm, a flexible element bent about said pulleys and means for rotating said first mentioned pulley and worm comprising means for varying the distance between said pulleys.

11. In a slicing machine, comprising a cutter, a reciprocating element and a forwardly feeding element, means for feeding said element forward in response to the reciprocation of the reciprocating element, comprising a member rotatably mounted thereon, a pulley therefor, a pulley lever and pulley mounted on the reciprocating element, a flexible element bent about said pulleys and fixed at one end to the reciprocating element, a cam element mounted on the slicing machine, a cam stop on said pulley lever adapted to be brought into contact with said cam element by the reciprocation of the reciprocating element, the cam stop being positioned intermediate the ends of the lever, the pulley being pivoted at the free end of the lever.

12. In a slicing machine, comprising a cutter, a reciprocating element and a forwardly feeding element, means for feeding said element forward in response to the reciprocation of the reciprocating element, comprising a member rotatably mounted thereon, a pulley therefor, a pulley lever and pulley mounted on the reciprocating element, a yielding flexible element bent about said pulleys and fixed at one end to the reciprocating element, a cam element mounted on the slicing machine, a cam stop on said pulley lever adapted to be brought in contact with said cam element by the reciprocation of the reciprocating element, the cam stop being positioned intermediate the ends of the lever, the pulley being pivoted at the free end of the lever.

13. In a slicing machine comprising a cutter, a reciprocating element and a forwardly feeding element, means for feeding said element forward in response to the reciprocation, comprising a member rotatably mounted thereon, a pulley therefor, a pulley lever and pulley mounted on the reciprocating element, a flexible element bent about said pulleys and fixed at one end to the reciprocating element, a cam element mounted on the slicing machine, and a cam stop on said pulley lever adapted to be brought in contact with said cam element by the reciprocation, and means for adjusting said cam element along the slicing machine frame.

14. In a slicing machine comprising a cutter, a reciprocating element and a forwardly feeding element, means for feeding said element forward in response to the reciprocation, comprising a member rotatably mounted thereon, a pulley therefor, a pulley lever and pulley mounted on the reciprocating element, a flexible element bent about said pulleys and fixed at one end to the reciprocating element, a cam element mounted on the slicing machine, and a cam stop on said pulley lever adapted to be brought in contact with said cam element by the reciprocation, means for adjusting said cam element along the slicing machine frame, and means for preventing play of said cam comprising a yieldingly actuated compression element interposed between said cam and said frame.

15. In a slicing machine a reciprocating element, a feeding element adapted to be fed forward by the reciprocation of the reciprocating element, a worm mounted on said reciprocating element and adapted to be driven by said reciprocation, a nut mounted on said feeding element, means for holding it normally in contact with said worm, and means for withdrawing it from said contact, comprising an inclined surfaced block on the carrier, and an opposed inclined surfaced block connected with said nut and means for rotating them in relation to each other.

16. In a meat slicing machine a reciprocating element, a feeding element adapted to be fed forward by the reciprocation of the reciprocating element, a removable meat end plate therefor comprising a substantially horizontal element and a vertical end element integral therewith and meat securing members mounted upon said end element.

17. In a meat slicing machine a reciprocating element, a feeding element adapted to be fed forward by the reciprocation of the reciprocating element, a removable meat end plate therefor comprising a substantially horizontal element and a vertical end element integral therewith and meat securing members mounted upon said end element, said reciprocating element being channeled to receive said meat plate, and securing means therefor comprising overhanging stops at one side of said channel and a rotatable eccentric clamp at the other side thereof.

18. In a meat slicing machine a reciprocating element, a feeding element adapted to be fed forward by the reciprocation of the reciprocating element, a removable meat end plate therefor comprising a substantially horizontal element and a vertical end element integral therewith and meat securing members mounted upon said end element, said reciprocating element being channeled to receive said meat plate, and securing means therefor comprising overhanging stops at one side of said channel and a rotatable eccentric clamp at the other side thereof, and an additional connection between the feeding element and the plate adapted to prevent axial movement along said channed.

19. In a meat slicing machine a reciprocating element, a feeding element adapted to be fed forward by the reciprocation of the reciprocating element, a meat clamp on said feeding element, and a removable meat plate mounted on said element, and securing means therefor comprising overhanging stops at one side of said feeding element and a rotatable eccentric clamp at the other side thereof, and an additional transverse sliding connection between the feeding element and the plate adapted to prevent axial movement of the plate.

20. In a meat slicing machine, a reciprocating element, a feeding element adapted to be fed forward by its reciprocation, a removable meat plate mounted on said element, the feeding element being channeled to receive it, and securing means therefor comprising overhanging stops at one side of the feeding element and a rotatable eccentric clamp at the other side thereof, and an additional transverse sliding connection between feeding element and plate adapted to prevent axial movement of the plate along the feeding element.

21. In a slicing machine comprising a rotary knife, a reciprocating element adapted to be reciprocated across the face of the knife and a feeding member adapted to be fed forwardly upon said reciprocating element by the reciprocation thereof, said reciprocating element being externally channeled, said feeding element being adapted to overhang said reciprocating element and being provided with members adapted to penetrate said channels.

22. In a slicing machine comprising a rotary knife, a reciprocating element adapted to be reciprocated across the face of the knife and a feeding member adapted to be fed forwardly upon said reciprocating element by the reciprocation thereof, said reciprocating element being externally channeled, said feeding element being adapted to overhang said reciprocating element and being provided with members adapted to penetrate said channels, and yielding means interposed between said feeding element and said reciprocating element adapted to be compressed within one of said channels.

23. In a slicing machine comprising a rotary knife, a reciprocating element adapted to be reciprocated across the face of the knife and a feeding member adapted to be fed forwardly upon said reciprocating element by the reciprocation thereof, said reciprocating element being externally channeled, said feeding element being adapted to overhang said reciprocating element and being provided with members adapted to penetrate said channels, and yielding means interposed between said feeding element and said reciprocating element adapted to be compressed within one of said channels, comprising a plurality of flat leaf springs.

24. In a slicing machine comprising a rotary knife, a reciprocating element adapted to be reciprocated across the face of the knife and a feeding member adapted to be fed forwardly upon said reciprocating element by the reciprocation thereof, said reciprocating element being externally channeled, said feeding element being adapted to overhang said reciprocating element and being provided with members adapted to penetrate said channels, and yielding means interposed between said feeding element and said reciprocating element adapted to be compressed within one of said channels, comprising a plurality of flat leaf springs fixed against axial movement in relation to the feeding member but slidable in relation to the reciprocating member.

25. In a slicing machine comprising a rotary knife, a reciprocating element adapted to be reciprocated across the face of the knife and a feeding member adapted to be fed forwardly upon said reciprocating element by the reciprocation thereof, said reciprocating element being externally channeled, said feeding element being adapted to overhang said reciprocating element and being provided with members adapted to penetrate said channels, and yielding means interposed between said feeding element and said reciprocating element adapted to be compressed within one of said channels, comprising a plurality of flat leaf springs fixed against axial movement in relation to the feeding member but slidable in relation to the reciprocating member, and stops mounted at each end of the feeding member and adapted to engage said stops and limit the movement of said springs in relation to said feeding member.

26. In a slicing machine comprising a rotary knife, a reciprocating element adapted to be reciprocated across the face of the knife and a feeding member adapted to be fed forwardly upon said reciprocating element by the reciprocation thereof, said reciprocating element being externally channeled, said feeding element being adapted to overhang said reciprocating element and being provided with members adapted to penetrate said channels, and yielding means interposed between said feeding element and said reciprocating element adapted to be compressed within one of said channels, comprising a plurality of flat leaf springs fixed against axial movement in relation to the feeding member but slidable in relation to the reciprocating member, and stops mounted at either end of the feeding member and adapted to engage said slots and limit the movement of said springs in relation to said feeding member, and stops mounted on said reciprocating element and adapted to limit the movement of said feeding element along said slots.

27. In a slicing machine an externally channeled reciprocating carriage, a feeding plate mounted above said carriage and supported independently of the top of the carriage.

28. In a slicing machine, a reciprocating carriage, vertical side elements therefor, horizontal bearing surfaces along the exterior of said side elements, a cover plate for said reciprocating carriage, a slidable feeding plate above and out of contact with said cover plate, and supporting means therefor in slidable contact with the bearing surface along said side elements.

29. In a meat slicing machine, a reciprocating element, a feeding element adapted to be fed forward by the reciprocation of the reciprocating element, a meat clamp upon said feeding element, a meat end plate and means for securing it to the upper surface of said feeding element.

30. In a meat slicing machine, a reciprocating element, a feeding element adapted to be fed forward by the reciprocation of the reciprocating element, a meat clamp on said feeding element, said feeding element being shaped to receive at will a removable, horizontal surfaced meat plate, and a removable meat end plate, and means for securing them against the upper surface of the feeding element.

31. In a meat slicing machine, a reciprocating element, a cutting element, an open topped feeding element adapted to be fed forwardly toward the cutting element, by the reciprocation of the reciprocating element, and a meat plate removably supported thereupon.

32. In a meat slicing machine, a reciprocating element, a cutting element, an open topped feeding element adapted to be fed forwardly toward the cutting element, by the reciprocation of the reciprocating element, a meat clamp on said feeding element, and a meat plate removably supported upon said element.

33. In a meat slicing machine, a reciprocating element, a cutting element, an open topped feeding element adapted to be fed forwardly toward the cutting element, by the reciprocation of the reciprocating element, a meat clamp on said feeding element, and a meat plate removably supported upon said element and adapted to penetrate beneath said clamp.

34. In a meat slicing machine, a reciprocating element, a cutting element, an open topped feeding element adapted to be fed forwardly toward the cutting element, by the reciprocation of the reciprocating element, and an imperforate meat plate removably supported thereupon.

35. In a meat slicing machine, a rotary knife, a reciprocating element adapted to be reciprocated across the axis of rotation of said knife, a feeding element, and means for feeding it forwardly toward the knife in response to movement of the reciprocating element, said feeding element comprising in part side bars and connecting cross bars therefor, and a removable meat plate and means for securing it upon said side and cross bars.

Signed at Chicago, county of Cook, and State of Illinois, this 13th day of May, 1922.

WALLACE B. WOLFF.